United States Patent Office 2,875,106
Patented Feb. 24, 1959

2,875,106
OPTICAL WHITENING AGENTS

Dennis Arthur William Adams, Leeds, and Asim Kumar Sarkar, Castleford, England, assignors to Hickson & Welch Limited, Castleford, England, a British company No Drawing. Application March 15, 1957
Serial No. 646,227

Claims priority, application Great Britain March 21, 1956

16 Claims. (Cl. 117—335)

This invention is concerned with improvements in or relating to optical whitening agents and is more particularly concerned with certain new compounds for use as optical whitening agents.

Optical whitening agents have in recent years found extensive use in the treatment of textiles particularly during washing and are designed to counteract the yellow or off-white colour which white textiles, particularly cellulosic textiles, may possess, especially after repeated washing. Such optical whitening agents also tend to improve coloured textiles as they impart a general brightness to them. They are also widely used to impart whiteness to other cellulosic material, particularly paper.

Optical whitening agents in general absorb light in the ultra violet range of the spectrum and emit in the visible spectrum, usually in the bluish green to bluish violet. Thus, the fluorescence of such compounds in white material tends to counteract any yellowing as for example that resulting upon repeated washing of a white cotton or linen textile. The compounds used as optical whitening agents must be substantive to the material being treated, and must be substantially stable when "dyed" on the material being treated.

A disadvantage which results however from the use of many of the known optical whitening agents such as certain derivatives of stilbene, which fluoresce in the blue or blue-violet end of the visible spectrum, is that they have too high an affinity for cellulose and consequently a textile after repeated treatment may take on an unpleasant reddish tinged fluorescence due to build-up of the optical whitening agent on the textile.

It is an object of the present invention to provide optical whitening agents for cellulosic materials in which the above-mentioned disadvantage is reduced.

We have found that certain new compounds of the general formula:

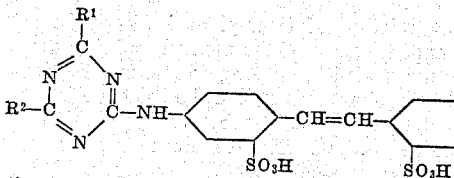

(in which $R^1$ represents an amino group, or a residue of a primary or secondary amine which does not contain an auxochrome or a chromophore, which is linked to the adjacent triazine ring through its nitrogen atom, and $R^2$ represents a chlorine atom, a hydroxyl group or has the same meaning as $R^1$), and salts of such compounds can be used with advantage as optical whitening agents. Accordingly the invention comprises such compounds together with salts thereof, especially water-soluble salts such as alkali-metal, e. g. sodium salts.

The primary or secondary amines from which the groups $R^1$ and $R^2$ are derived include for example aliphatic amines of low molecular weight such as methylamine, ethylamine, propylamine, butylamine, dimethylamine, dipropylamine, monoethanolamine, diethanolamine and we prefer the group $R^2$ to be a residue of one of these amines. Other suitable amines include aryl amines for example, aniline, an anisidine or a toluidine, which may if desired contain substituents such as halogen, alkyl or alkoxy groups; solubilizing groups such as sulphonic and carboxylic groups may also be persent but the presence of a chromophoric group such as a nitro group is undesirable. Heterocyclic amines such as morpholine are also suitable. We prefer the group $R^1$ to be a residue of one of the aryl or heterocyclic amines mentioned above.

As will be appreciated the groups $R^1$ and $R^2$ are symmetrically placed in the compounds of formula 1 above, these groups being in the 3– and 5–positions relative to the side chain. Therefore, in the preparation of such compounds, which is described hereafter, it will be apparent that the groups $R^1$ and $R^2$ may be attached in any desired sequence.

The compounds of the present invention have a good affinity for cellulosic materials, particularly cotton and linen textiles and paper, and exhibit a green fluorescence. They have only a moderate or balanced substantivity to cellulosic material and thus, when used as optical whitening agents in washing preparations they do not build up in the material being treated to the same extent as known optical whitening agents. They may conveniently be used in conjunction with other known optical whitening agents which exhibit a bluish or violet fluorescence, for example certain stilbene derivatives, in which case the buildup of the unpleasant reddish-tinged fluorescence, referred to above can be substantially reduced. A control of the optical whitening produced in a textile can therefore be achieved by the use of a composition containing a compound according to the invention together with known optical whitening agents.

According to a feature of the invention therefore there is provided a composition adapted for the treatment of cellulosic materials comprising a compound of the formula

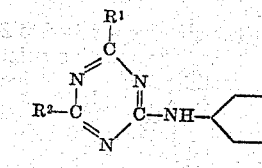 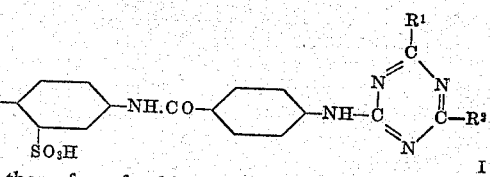

I or a salt thereof, preferably water soluble salts, especially alkali metal e. g. sodium salts (where $R^1$ and $R^2$, have the above stated meanings) which composition may, if desired, contain other optical whitening agents. The invention also includes in particular cotton or linen textiles, and paper, when treated with such a composition.

Compositions containing the new optical whitening agents may take any convenient form, for example the optical whitening agents may be incorporated in detergents or soaps for washing textiles, the detergents or soaps being in solid or liquid form. The new optical whitening agents may also be incorporated in baths for the treatment of cellulosic materials during their production or for treatment of the finished textile article.

The optical whitening agents may also be incorporated in compositions for the treatment of paper and photographic paper where high whiteness is necessary.

The new compounds according to the invention may conveniently be prepared by reacting a compound of the formula

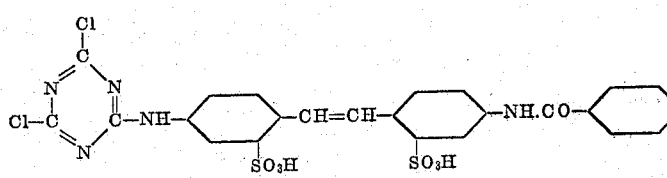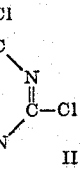

II with one or more compounds of the general formula HX in which X represents an amino group, or a residue of a primary or secondary amine which does not contain an auxochrome, linked to the hydrogen atom through its nitrogen atom, to effect replacement of two or four chlorine atoms by the group X, any remaining chlorine atoms, if desired, subsequently being replaced by hydroxyl groups.

The number of chlorine atoms replaced by the group X will depend largely on the conditions used for the reaction, and the molecular ratio of the reactants. The replacement reactions are conveniently carried out in solution at neutral pH, the replacement of the first two chlorine atoms in general taking place at 25–50° C. whilst the replacement of further chlorine atoms may require a higher temperature for example 50–100° C.

Where it is desired to replace all of the chlorine atoms in the compound of Formula II by a group X it is preferred to conduct the replacement of the chlorine atoms in two stages, for example by reacting the compound of Formula II with a compound of the formula HX, for example aniline, at 25–50° C. to replace two of the chlorine atoms in the molecule, and then to raise the temperature of the reaction mixture to say, 50–100° C., and to add a quantity of a further compound of the formula HX, in which X may be different from that of the first compound, for example diethanolamine, to replace the remaining chlorine atoms.

As stated above any unreplaced chlorine atoms may, if desired be converted to hydroxy groups. This can conveniently be effected by treatment with an equivalent amount of sodium hydroxide solution to hydrolyse off the chlorine atoms.

The compound of Formula II may conveniently be prepared by treating the disodium salt of 4-amino-4'-(p-amino-benzoylamino)-stilbene-2:2'-disulphonic acid with cyanuric chloride. The condensation of cyanuric chloride preferably takes place at acid pH, and at room temperature, the cyanuric chloride being preferably added to the reaction in solution in an organic solvent, for example, toluene or acetone. An alkali, e. g. sodium hydroxide is conveniently added subsequently to bring the reaction mixture to neutral pH before proceeding with the other stages of the reaction. Although the product may be isolated at this stage it is preferred to treat the product without isolation by the process described above to yield the new compounds of the present invention.

The disodium salt of 4-amino-4'(p-amino-benzoyl-amino)-stilbene-2:2'-disulphonic acid can be readily obtained, for example, from 4-amino-4'-(p-nitrobenzoyl-amino)-stilbene-2:2'-disulphonic acid by reduction thereof with iron powder and hydrochloric acid, according to the Béchamp method and treatment of the product with excess sodium hydroxide, whilst the 4-amino-4'-(p-nitro-benzoyl-amino)-stilbene-2:2'-disulphonic acid used as starting material for the reduction may conveniently be prepared by the condensation of p-nitrobenzoyl chloride with 4-amino-4'-nitro-stilbene-2:2'-disulphonic acid.

In order that the invention may be well understood the following examples are given by way of illustration only (in these examples, the composition of the final product is stated by specifying the groups $R^1$ and $R^2$ in the general Formula I given above; also parts are parts by weight):

*Example 1*

A solution of 165 parts of 4-nitro-4'-amino-stilbene-2:2'-disulphonic acid (80% strength), neutralised with 35 parts of sodium carbonate, in 1200 parts of water, is heated to 70° C. To this solution is added dropwise with vigorous stirring, a solution of 67 parts of p-nitro-benzoyl chloride in 200 parts of toluene during half-an-hour with the simultaneous addition of 36 parts of calcium carbonate as acid binding agent.

The stirred mixture is heated gently to the boiling point and refluxed for about 2 hours. It is then acidified with hydrochloric acid and cooled to 15° C. The precipitated solid is filtered and washed. The product, 4-amino-4'-(p-nitrobenzoyl-amino)-stilbene-2:2'-disulphonic acid, is then reduced with iron powder and hydrochloric acid by the Béchamp method. The 4-amino-4'-(p-amino-benzoyl-amino)-stilbene-2:2'-disulphonic acid, a pale yellow crystalline product, is isolated by crystallization from water as the sodium salt.

16 parts of the disodium salt of 4-amino-4'-(p-amino-benzoyl-amino)-stilbene-2:2'-disulphonic acid (83% pure) are dissolved in 500 parts of water and added slowly to a well-stirred solution of 9.25 gms. cyanuric chloride in 100 parts of toluene, the reaction mixture being maintained neutral by the addition of 10% sodium hydroxide from time to time to neutralize the hydrochloric acid formed and the temperature maintained at 10–15° C. Whilst maintaining the reaction mixture neutral with sodium hydroxide it is stirred until no more primary amino groups can be detected (as judged by the diazo reaction).

The mixture is raised to 25° C. and 4.65 parts of aniline added. The reaction mixture is maintained neutral by the addition of sodium hydroxide solution as before till the first two chlorine atoms are replaced by aniline and no more aniline can be detected (as judged by the diazo reaction).

The mixture is heated to 40° C. and salted out to obtain the compound $R_1 = NHC_6H_5$ and $R_2 = Cl$. This compound can be used for brightening textiles.

*Example 2*

The reaction mixture of Example 1 is slowly heated to 50° C. without isolation of the product and 5.25 parts of diethanolamine added. The temperature is then gradually raised to the boiling point and the toluene distilled off. The reaction is assisted as before by addition of sodium hydroxide solution. The reaction mixture is then cooled, filtered and washed. On drying the residue a product is obtained in the form of the sodium salt after filtration and drying, in the form of a light yellow powder which is very suitable due to its fluorescent properties and affinity for cellulose, for brightening and whitening textile goods. It is the di-sodium salt of the compound in which $R^1$ is $-NHC_6H_5$ and $R^2$ is $-N(CH_2CH_2OH)_2$.

Example 3

When the compound obtained in Example 1 is reacted with a further molecule of aniline at a temperature between 50–100° C., and the sodium salt isolated at the end of the reaction by cooling and filtering, a product is obtained in which $R^1=NHC_6H_5$ and $R^2=NHC_6H_5$ which compound has a strong fluorescence, is substantive to cotton and can be applied to cellulosic material like cotton fabric or paper.

Example 4

16 parts of 4-amino-4'-(p-amino-benzoyl-amino)-stilbene-2:2'-disulphonic acid obtained as described in Example 1 is dissolved in 500 parts of water and the solution added, with vigorous agitation, to a suspension of finely divided cyanuric chloride in cold aqueous acetone, prepared by addition of 200 parts of ice to a solution of 9.2 parts of cyanuric chloride in 50 parts of acetone. During the addition of this solution the reaction mixture is maintained at 10–16° C. The hydrochloric acid produced during the reaction is neutralized by the addition of a dilute solution of sodium hydroxide. The reaction is complete when the mixture no longer gives the usual diazo test for excess amine.

The temperature of the reaction mixture is then raised to 25–30° C. and 3.05 parts of monoethanolamine, dissolved in 10 parts of water, is run in slowly. The hydrochloric acid produced by the reaction is gradually neutralized by the addition of a dilute solution of sodium hydroxide. When the monoethanolamine has completely reacted with the first two chlorine atoms in the two cyanuric chloride molecules, the temperature of the final reaction mixture is raised to 60° C. without isolation of the product and 40 parts of sodium hydroxide solution (10%) are added to the suspension. The mixture is slowly raised to the boil and after refluxing for 1 hour to ensure completion of hydrolysis of the remaining two chlorine atoms to hydroxyl groups the acetone is distilled off. The product which precipitates on cooling, is isolated by filtering and on drying gives a bright yellow powder, which is again fluorescent and has good affinity for cellulose. This is the sodium salt of the compound in which $R^2$ is —OH and $R^1$ is —$NHCH_2CH_2OH$.

Example 5

32 parts of 4-amino-4'-(p-amino-benzoyl-amino)-stilbene-2:2'-disulphonic acid (83% pure) are condensed with 18.5 parts of cyanuric chloride as described in Example 1.

The compound so obtained is not isolated and is reacted first with 21.2 parts of the sodium salt of metanilic acid at 25–35° C. and then with 9.3 parts of aniline at 50–100° C. The final product is isolated as the sodium salt by salting out. A product is obtained in which

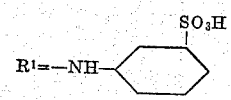

and $R^2=NHC_6H_5$, which product gives a solution which exhibits bluish green fluorescence and is substantive to cellulose.

Example 6

When the compound obtained by condensing 16 parts of 4-amino-4'-(p-amino-benzoyl-amino)-stilbene-2:2'-disulphonic acid (83% pure) and 9.25 parts of cyanuric chloride as in Example 1, is condensed first with 9.3 parts of aniline and then with 8.7 parts of morpholine a product is obtained in which

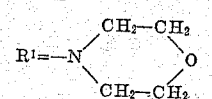

and $R^2=NHC_6H_5$. The product is of very similar properties to the product obtained in Example 2.

Example 7

When in Example 2 aniline is replaced by p-anisidine (6.15 parts) a product is obtained in which

and $R^2=-N(CH_2CH_2OH)_2$ which is very similar in properties to the product of Example 2.

Example 8

32 parts of 4-amino-4'-(p-amino-benzoyl-amino)-stilbene-2:2'-disulphonic acid (disodium salt) are condensed as before with 18.5 parts of cyanuric chloride. The intermediate compound is next condensed first with 2 mols. of diethanolamine and next with a further 2 mols. of diethanolamine. The product in which

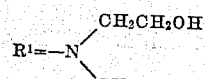

and

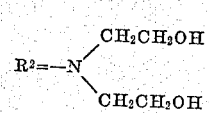

is obtained by salting out and is quite soluble in water. An aqueous solution of the product exhibits a greenish blue fluorescence.

Example 9

When the product obtained in Example 1 is refluxed with an excess of ammonia (12 parts, sp. gr. 0.88) for about 4 hours and allowed to cool and acidified, the free acid of the compound $R^1=NHC_6H_5$ and $R^2=NH_2$ is obtained. This compound is fluorescent in solution and is substantive to cellulose.

Example 10

When the compound obtained in Example 1 is refluxed with 10 parts of monomethylamine (40%) and the product salted out, a compound in which $R^1=-NHC_6H_5$ and $R^2=-NHCH_3$ is obtained. This compound has properties very similar to those obtained in Examples 2 and 6.

Example 11

32 parts of 4-amino-4'-(p-amino-benzoyl-amino)-stilbene-2:2'-disulphonic acid (disodium salt 83%) are condensed as described in Example 1 with 18.5 parts cyanuric chloride at 10–15° C. This compound, without isolation, is further condensed with 6.1 parts of monoethanolamine at 25–50° C. and with 24 parts of dehydro-thio-p-toluidine at 50–100° C. When the condensation is complete a product in which

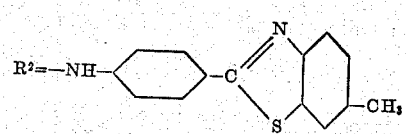

and $R^1=-NH-CH_2CH_2OH$ is isolated by acidification, filtration, washing and drying. It is a greenish yellow product which gives a slightly greener shade of fluorescence on cotton than the other compounds mentioned above.

Example 12

32 parts of 4-amino-4'-(p-amino-benzoyl-amino)-stilbene-2:2'-disulphonic acid were condensed with 18.5 parts cyanuric chloride and the compound obtained then condensed with 10.7 parts of methyl aniline and 10.5 parts diethanolamine in the usual manner. The resulting product is isolated as the sodium salt and has excellent brightening properties on cellulose when applied from a detergent or neutral bath.

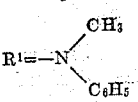

and

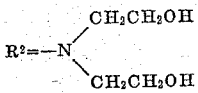

Example 13

A piece of white cotton poplin (bleached) is treated in a bath with .02% of the compound obtained according to Example 2 in the presence of the 5% sodium sulphate (Glauber's salt) for half-an-hour at 60° C. in a dye bath. After rinsing and drying, the material appears considerably whiter and brighter than the untreated material. The material has a faintly greenish fluorescence.

We claim:

1. As an optical whitening and brightening agent, the compound having in its free acid form the formula

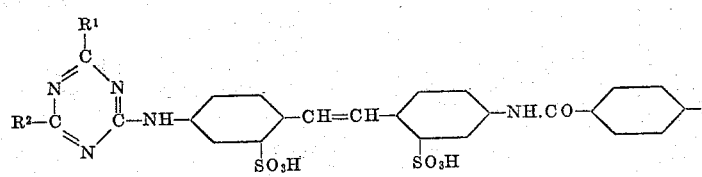

where $R^1$ is selected from the group consisting of morpholino and

in which X and Y are selected from the group consisting of hydrogen, lower alkyl, lower hydroxy alkyl, phenyl, methoxy phenyl, tolyl

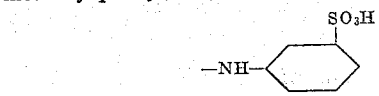

and

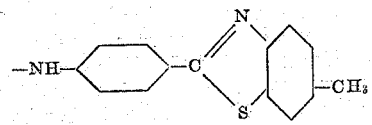

and $R^2$ is selected from the group consisting of $R^1$, chloro and hydroxyl.

2. The alkali-metal salts of the compounds defined in claim 1.
3. The sodium salts of the compounds defined in claim 1.
4. A compound as defined in claim 1 in which $R^1$ is —$NHC_6H_5$ and $R^2$ is a chlorine atom and the sodium salts thereof.
5. A compound as defined in claim 1 in which $R^1$ is —$NHC_6H_5$ and $R^2$ is

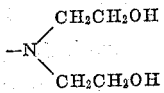

and the sodium salts thereof.

6. A compound as defined in claim 1 in which $R^1$ is —$NHC_6H_5$ and $R^2$ is —$NHC_6H_5$ and the sodium salts thereof.
7. A compound as defined in claim 1 in which $R^1$ is —$NHCH_2CH_2OH$ and $R^2$ is a hydroxyl group and the sodium salts thereof.

8. A compound as defined in claim 1 in which $R^1$ is

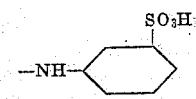

and $R^2$ is —$NHC_6H_5$ and the sodium salts thereof.

9. A compound as defined in claim 1 in which $R^1$ is

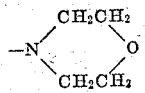

and $R^2$ is —$NHC_6H_5$ and the sodium salts thereof.

10. A compound as defined in claim 1 in which $R^1$ is

and $R^2$ is

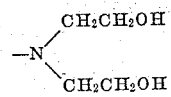

and the sodium salts thereof.

11. A compound as defined in claim 1 in which $R^1$ is

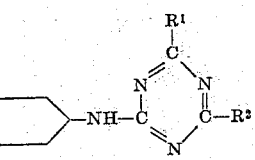

and $R^2$ is

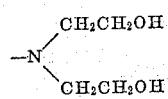

and the sodium salts thereof.

12. A compound as defined in claim 1 in which $R^1$ is —$NHC_6H_5$ and $R^2$ is —$NH_2$ and the sodium salts thereof.
13. A compound as defined in claim 1 in which $R^1$ is —$NHC_6H_5$ and $R^2$ is —$NHCH_3$ and the sodium salts thereof.
14. A compound as defined in claim 1 in which $R^1$ is —$NHCH_2CH_2OH$ and $R^2$ is

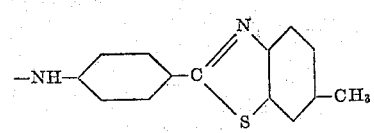

and the sodium salts thereof.

15. A compound as defined in claim 1 in which $R^1$ is

and $R^2$ is

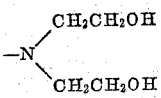

and the sodium salts thereof.

16. A process for improving the whiteness and brightness of cellulosic textiles comprising treating said textiles with the compound having in its free acid form the formula

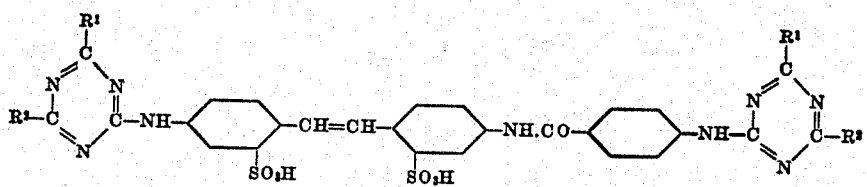

where R¹ is selected from the group consisting of morpholino and

in which X and Y are selected from the group consisting of hydrogen, lower alkyl, lower hydroxy alkyl, phenyl, methoxy phenyl, tolyl

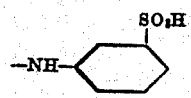

and

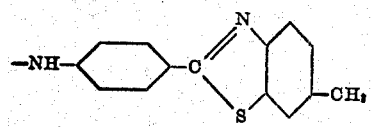

and R² is selected from the group consisting of R¹, chloro and hydroxyl.

References Cited in the file of this patent
UNITED STATES PATENTS

| | | |
|---|---|---|
| 2,694,064 | Hausermann | Nov. 9, 1954 |
| 2,778,827 | Ackermann | Jan. 22, 1957 |

FOREIGN PATENTS

| | | |
|---|---|---|
| 973,938 | France | Feb. 16, 1951 |